(12) United States Patent
Hayslett et al.

(10) Patent No.: US 9,803,750 B2
(45) Date of Patent: Oct. 31, 2017

(54) ELECTRIC BIKE POWERTRAIN WITH COMPOUND PLANETARY

(71) Applicant: GM Global Technology Operations LLC, Detroit, MI (US)

(72) Inventors: Steven L. Hayslett, Troy, MI (US); Shawn H. Swales, Canton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 14/702,079

(22) Filed: May 1, 2015

(65) Prior Publication Data
US 2016/0318577 A1  Nov. 3, 2016

(51) Int. Cl.
*F16H 63/50* (2006.01)
*B62M 11/14* (2006.01)
*B62M 6/55* (2010.01)

(52) U.S. Cl.
CPC .............. *F16H 63/50* (2013.01); *B62M 6/55* (2013.01); *B62M 11/145* (2013.01)

(58) Field of Classification Search
CPC ................................. B62M 6/55; B62M 11/145
See application file for complete search history.

(56) References Cited

U.S. PATENT DOCUMENTS

| | | | |
|---|---|---|---|
| 6,296,072 B1* | 10/2001 | Turner | B62M 6/55 180/206.2 |
| 8,651,993 B1* | 2/2014 | Watarai | B62M 6/55 475/205 |
| 9,254,890 B2* | 2/2016 | Deleval | B62M 6/55 |
| 9,637,197 B2* | 5/2017 | Hayslett | B60L 11/007 |
| 2016/0159431 A1* | 6/2016 | Hayslett | B62M 6/50 180/206.3 |
| 2017/0029065 A1* | 2/2017 | Hayslett | B62M 6/50 |
| 2017/0029068 A1* | 2/2017 | Hayslett | B62M 11/145 |

* cited by examiner

*Primary Examiner* — Derek D Knight
(74) *Attorney, Agent, or Firm* — BrooksGroup (57) ABSTRACT

A number of variations may include an electric cycle powertrain comprising: a motor comprising a rotor and a stator; a crankshaft operatively connected to a first and second pedal assembly; a stepped pinion planetary gear set comprising a sun gear, at least one stepped pinion gear having a first and second pinion operatively attached to each other, wherein the first pinion is operatively connected to the sun gear and rotates within a grounded first ring gear and the second pinion rotates within a second ring gear; wherein the sun gear is further operatively connected to the rotor; wherein the second ring gear is operatively connected to the crankshaft and the first and second pedal assembly; wherein the first and second pinions are operatively connected to a carrier; wherein the second ring gear is operatively connected to the chain; and a torque measuring device operatively connected to the crankshaft.

22 Claims, 5 Drawing Sheets

Fig.18 a number of variations may include an electric cycle powertrain comprising: a motor comprising a rotor and a stator; a crankshaft operatively connected to a first pedal assembly and a second pedal assembly; a stepped pinion planetary gear set comprising a sun gear, at least one stepped pinion gear having a first pinion and a second pinion operatively attached to each other, wherein the first pinion is operatively connected to the sun gear and rotates within a grounded first ring gear and the second pinion rotates within a second ring gear; wherein the sun gear is further operatively connected to the rotor; wherein the second ring gear is operatively connected to the crankshaft and the first pedal assembly and the second pedal assembly; wherein the first pinion and the second pinion are operatively connected to a carrier; wherein the second ring gear is operatively connected to the chain ring operatively connected to a chain which drives a rear sprocket of a rear wheel; and a torque measuring device operatively connected to the crankshaft.

ELECTRIC BIKE POWERTRAIN WITH COMPOUND PLANETARY

TECHNICAL FIELD

The field to which the disclosure generally relates to includes electric cycles having pedal force-based propulsion systems.

SUMMARY OF ILLUSTRATIVE VARIATIONS

A number of variations may include an electric cycle powertrain comprising: a motor comprising a rotor and a stator; a crankshaft operatively connected to a first pedal assembly and a second pedal assembly; a stepped pinion planetary gear set comprising a sun gear, at least one stepped pinion gear having a first pinion and a second pinion operatively attached to each other, wherein the first pinion is operatively connected to the sun gear and rotates within a grounded first ring gear and the second pinion rotates within a second ring gear; wherein the sun gear is further operatively connected to the rotor; wherein the second ring gear is operatively connected to the crankshaft and the first pedal assembly and the second pedal assembly; wherein the first pinion and the second pinion are operatively connected to a carrier; wherein the second ring gear is operatively connected to the chain ring operatively connected to a chain which drives a rear sprocket of a rear wheel; and a torque measuring device operatively connected to the crankshaft.

A number of variations may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a rear wheel connected to the rear hub; a motor comprising a stator and a rotor operatively connected to the crankshaft; a battery pack operatively connected to the motor; a stepped pinion planetary gear set comprising a sun gear, at least one stepped pinion gear having a first pinion and a second pinion operatively connected to each other and operatively connected to the sun gear, wherein the first pinion rotates within a grounded first ring gear and the second pinion rotates within a second ring gear; wherein the sun gear is operatively connected to the rotor and the crankshaft; wherein the second ring gear is operatively connected to the crankshaft and the first pedal assembly and the second pedal assembly; wherein the at least one stepped pinion gear is operatively connected to a carrier; and wherein the carrier is operatively connected to the chain ring to drive the rear sprocket; and a torque measuring device operatively connected to the crankshaft constructed and arranged to measure a reaction torque of the crankshaft and to calculate a rider input torque based on the reaction torque of the crankshaft to control operation of the motor during a coaster mode or a regenerative braking mode.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
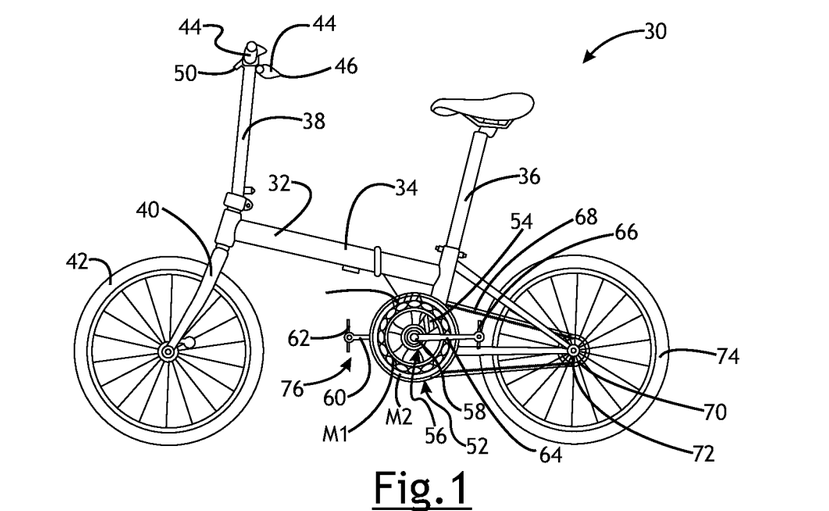
FIG. 1 illustrates a side view of an electric cycle according to a number of variations.

FIG. 1 illustrates a number of variations which may include an electric cycle 30. In any of a number of variations, the electric cycle 30 may include a frame 32 which may include a top tube 34 connected to a seat tube 36. A steerer tube 38 may extend from the top tube 34. The steerer tube 38 may be operatively connected to a front fork 40 which may be attached to a front wheel 42. Handlebars 44 may be attached to the steerer tube 38 and may be used to control the direction of the front wheel 42 by way of the front fork 40. Control levers 46 may be provided on the handlebars 44 and may be constructed and arranged to communicate with one or more electronic control devices 48, one or more mechanical mechanism E1, E2, E3, E4, and/or the motor 52, as will be discussed hereafter. The one or more electronic control devices 48 may include electronic processing components to receive input signals and to send out signals to control various components of the electric cycle 30, which may include sending output signals to control operation of the electric motor 52. In a number of variations the one or more electronic control devices 48 may include memory, a processor and software and/or hardware to process input signals and generate output signals, and may include formulas, lookup tables or other means for comparing and processing data. A brake lever 50 may also be provided on the handlebars 44, if desired.

The electric cycle 30 may include a crank assembly 56 which may include a crankshaft 58 having a first pedal assembly 60 and a second pedal assembly 64 connected thereto. The first pedal assembly 60 may include a first foot pedal 62, and the second pedal assembly 64 may include a second foot pedal 66. A chain ring or sprocket CR may be operatively connected to the crankshaft 58 for driving a chain 68 operatively connected to a rear sprocket 70 which may be operatively connected to a rear hub 72 of a rear wheel 74.

The electric cycle 30 may be constructed and arranged to allow a rider to rotate a first and second pedal assembly 60, 64 in a full clockwise or counter clockwise rotation to power the electric cycle 30 or may allow a rider to use a motor 52 with a pedal force-based propulsion system wherein the first and second pedal assemblies 60, 64 may be fixed in an approximately horizontal position so that a rider may provide intuitive input commands by applying a force to a first foot pedal 62 attached to the first pedal assembly 60 or a second foot pedal 66 attached to the second pedal assembly 64 in the clockwise or counter clockwise direction. The input commands are intuitive to the rider and may be similar to riding a non-motorize cycle wherein the rider applies a clockwise force to a cycle crankshaft 58 by applying force to a forward positioned foot pedal to move the cycle in a forward direction, and the rider applies a counter clockwise force to the electric cycle crankshaft 58 by applying force to a rearward positioned foot pedal 62, 66 to slow the electric cycle 30.

Reference herein as to clockwise or counter-clockwise is made with respect to the right hand side of the electric cycle 30 with an operator facing the forward direction of movement of the electric cycle 30.

The electric cycle 30 may be a bicycle, tricycle, or four-wheel electric cycle having a crank assembly constructed and arranged to allow a rider to provide input thereto using the first pedal assembly and the second pedal assembly.

In a number of variations, an electric cycle 30 may include an electric motor/generator 52 which may be used to propel the electric cycle 30 forward and may also include a regenerative system to generate electricity from motor/generator braking. The motor/generator 52 may be attached to the electric cycle 30 frame 32 adjacent the pedal assemblies 60, 64, chain ring CR (or belt ring), and/or crankshaft 58. The motor/generator 52 may include any of a number of types of motor/generators including, but not limited to, a brushless in runner ring motor. The motor 52 may include a stator M2 and rotor M1. The rotor M1 may rotate within the stator M2 which may be grounded. The motor 52 may be powered by any number of battery assemblies 54. In a number of variations, one or more electronic control devices 48 may be used to control the operation of the electric cycle 30. A stepped pinion planetary gear set PG1 may be operatively attached to the motor 52 and the first and second pedal assemblies 60, 64.

Figure 2:
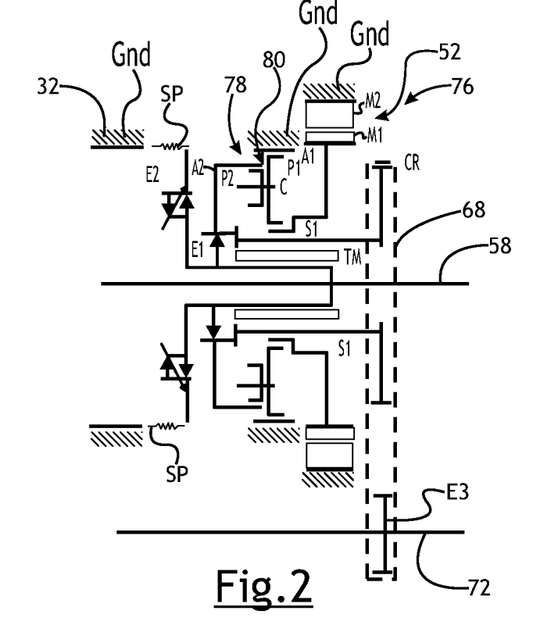
FIG. 2 illustrates a schematic of an electric cycle powertrain according to a number of variations.

Referring to FIG. 2, in a number of variations, a stepped pinion planetary gear set PG1 may include a sun gear S1 which may be operatively attached to the rotor M1 so that it may rotate from input from the motor 52. The second ring gear A2 may be operatively connected to the crankshaft 58 and a second pinion P2 of one or more stepped pinion gears 80, and may be rotated by the crankshaft 58 and the one or more stepped pinion gears 80 within a first ring gear A1 which may be grounded. In a number of variations, the first and second pinion P1, P2 may be operatively attached to each. The first pinion P1 of the one or more stepped pinion gears 80 may have a diameter larger than a second pinion P2 of the one or more stepped pinion gears 80. In a number of variations, the first pinion P1 of the one or more stepped pinion gears 80 may be operatively connected to the sun gear S1 and may be constructed and arranged so that when the sun gear S1 is rotated by the motor/generator 52 it causes the first pinion P1 of the at least one stepped pinion gears 80 to rotate within a first ring gear A1 which may be grounded. The one or more second pinions P2 of the one or more stepped pinion gears 80 may be operatively connected to a second ring gear A2 and may rotate within the second ring gear A2. In a number of variations, the second ring gear A2 may be operatively connected to the crankshaft 58 and the first and second pedal assemblies 60, 64 and may be constructed and arranged so that it may receive torque input from the first and second pedal assemblies 60, 64. The one or more stepped pinion gears 80 may be operatively connected to a carrier C and may be constructed and arranged so that when the one or more stepped pinion gears 80 rotate it causes the carrier C to also rotate. The ring gear A2 may be operatively connected to the chain ring CR and may be constructed and arranged to rotate the chain ring CR driving a rear sprocket 70 of a rear wheel 74. In a number of variations, the second ring gear A2 may be operatively connected to the crankshaft 58 and the first and second pedal assemblies 60, 64 and may be constructed and arranged so that it may receive torque input from the first and second pedal assemblies 60, 64.

Figure 3:
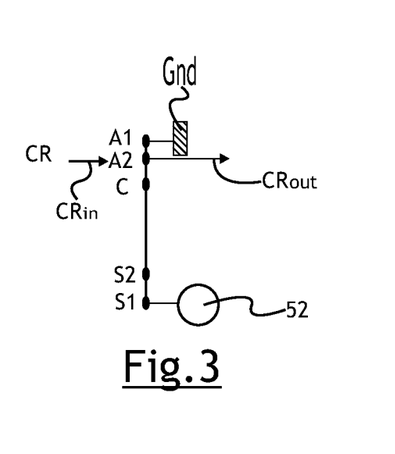
FIG. 3 illustrates a schematic of a lever diagram of the electric cycle powertrain illustrated in FIG. 2 according to a number of variations.

FIG. 3 illustrates a lever diagram according to the electric cycle powertrain 76 as illustrated in FIG. 2.

Referring to FIG. 2, in a number of variations, a torque measurement device TM including, but not limited to, a magneto static strain gage, may be operatively connected to the crankshaft 58 and may be used to measure the reaction torque from the crankshaft 58 which may be proportional to the rider input torque. The torque measurement device TM may send a signal of the rider input torque to an electronic control device 48 which may use the rider input torque to control operation of the motor 52 during a coaster mode or a regenerative braking mode. The placement of the torque measurement device TM on the crankshaft 58 may reduce packaging space required for the powertrain 76.

In a number of variations, a first mechanical mechanism E1 may be operatively attached to the first and second pedal assemblies 60, 64. The first mechanical mechanism E1 may be constructed and arranged so that when the first mechanical mechanism E1 is closed or engaged, torque may be provided from the crankshaft 58 to the chain ring CR, and when the first mechanical mechanism E1 is open, torque may be provided to the chain ring CR from rotation of the motor 52 and carrier C. The first mechanical mechanism E1 may allow input to the chain ring CR from the motor/generator 52 without back driving the crankshaft 58. This may allow for a high speed input from the motor/generation 52.

In a number of variations, a second mechanical mechanism E2 may be used to control the function of the first and second pedal assemblies 60, 64. The second mechanical mechanism E2 may be operatively connected to the first ring gear A1 through the first mechanical mechanism E1 and the torque measuring device TM. The second mechanical mechanism E2 may provide a rider with at least one of a normal pedal, electronic coaster brake, or pedal force throttle feel. The second mechanical mechanism E2 may be of any type suitable to provide at least one of the following: (1) allowing for the free rotation of the first and second pedal assemblies 60, 64 in both the clockwise and counterclockwise directions; (2) locking the first and second pedal assemblies 60, 64 and preventing rotation in both the clockwise and counterclockwise directions; (3) locking the first and second pedal assemblies 60, 64 preventing movement in the clockwise direction and allowing rotation in the counterclockwise direction; or (4) locking the first and second pedal assemblies 60, 64 preventing rotation in the counterclockwise direction but allowing rotation in the clockwise direction. In one variation, the second mechanical mechanism E2 may be a selective one-way clutch.

Referring to FIGS. 4-7, in a number of variations, the second mechanical mechanism E2 may include a base plate 82 having a plurality of tabs 84, 86 (first tabs 84 and second tab 86, or first set of tabs 84 and second set of tabs 86) pivotally connected thereto. A spring 88 may be provided for each tab 84, 86. The spring 88 may be connected to a tab 84, 86 and to the base plate 82 to bias the tab 84, 86 in one direction. A solenoid or servo may be provided having a plate or piston 90 that may be selectively moved out of an overlying position with respect to one of the tabs 84, 86 so that the spring 88 biases that tab 84, 86 upward and the tab 84, 86 engages a shoulder 92 of a cap 94 which may lie over the base plate 82. The cap 94 may be operatively connected to the crankshaft 58. The cap 94 may have a plurality of recesses 96 formed therein defined by features in the cap 94 so that each of the plurality of recesses 96 is defined in part by a shoulder 92 against which the tabs 84, 86 may lock and prevent rotation of the cap 94 in one direction and/or the other direction. The cap 94 may be operatively tied to the crankshaft 58 to allow or prevent rotation of the same. The second mechanical mechanism E2 may, in a number of variations, be servo controlled, causing the tabs 84, 86 to move into or out of locking position with respect to the shoulder 92 of the recesses 96 formed in the cap 94.

Figure 4:
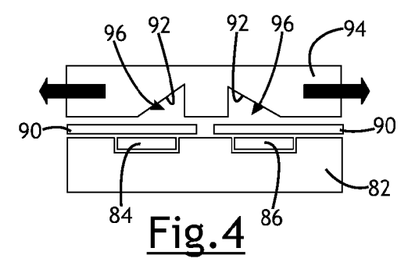
FIG. 4 illustrates a schematic of a mechanical mechanism according to a number of variations.

FIG. 4 is a schematic illustration showing a second mechanical mechanism E2 with the tabs 84, 86 in a retracted position with respect to the base plate 82 so that the cap 94, which is tied to the crankshaft 58, is free to rotate in both the clockwise and counterclockwise directions.

Figure 5:
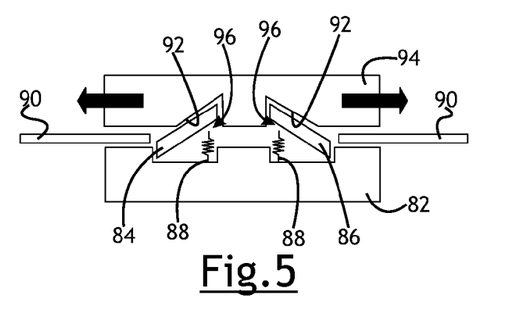
FIG. 5 illustrates a schematic of a mechanical mechanism according to a number of variations.

FIG. 5 is a schematic illustration of a second mechanical mechanism E2 wherein the first tab 84 (or first set of tabs 84) and the second tab 86 (or second set of tabs 86) are in an elevated position so that they engage a shoulder 92 formed in the cap 94, which is tied to the crankshaft 58, thereby preventing movement of the cap 94 and the crankshaft 58 in both the clockwise and counterclockwise directions.

Figure 6:
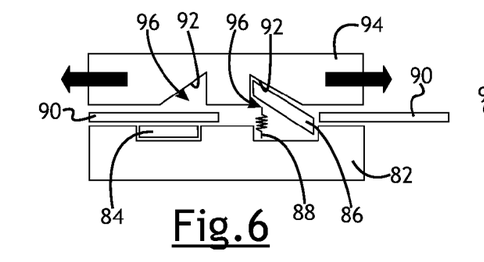
FIG. 6 illustrates a schematic of a mechanical mechanism according to a number of variations.

FIG. 6 is a schematic illustration of a second mechanical mechanism E2 wherein the second tab 86 (or second set of tabs 86) is in an elevated position with respect to the base plate 82 and so that the second tab 86 engages a shoulder 92 formed in the cap 94 preventing clockwise movement of the cap 94 and the crankshaft 58. However, the first tab 84 (or first set of tabs 84) is in a retracted position with respect to the base plate 82 and does not engage a shoulder 92 and thereby allows counterclockwise movement of the cap 94 and the crankshaft 58 tied thereto.

Figure 7:
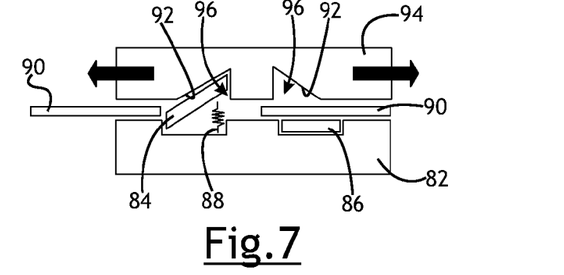
FIG. 7 illustrates a schematic of a mechanical mechanism according to a number of variations.

FIG. 7 is a schematic illustration of a second mechanical mechanism E2 wherein the first tab 84 (or first set of tabs 84) is in an elevated position with respect to the base plate 82 and so that the first tab 84 engages a shoulder 92 of the cap 94, preventing counterclockwise movement of the cap 94 and the crankshaft 58 tied thereto. However, the second tab 86 (or second set of tabs 86) is in a retracted position with respect to the base plate 82 and does not engage a shoulder 92 of the cap 94, thereby allowing clockwise rotation of the cap 94 and of the crankshaft 58 tied thereto.

Referring again to FIG. 2, in a number of variations, the electric cycle 30 may also include a third mechanical mechanism E3 which may be operatively attached to the rear hub 72 and may be constructed and arranged to connect or disconnect torque input from the chain ring CR to the rear hub 72. When the third mechanical mechanism E3 is closed, the rear hub 72 may be operatively connected to the rear sprocket 70 so that torque from the chain ring CR drives the rear hub 72 and when the third mechanical mechanism E3 is open, the rear hub 72 is disconnected from the rear sprocket 70 allowing the rear hub 72 and rear wheel 74 to coast freely without back drive lockup. In one variation, the third mechanical mechanism E3 may be a selective one-way clutch commonly referred to as a freewheel clutch.

Figure 16:
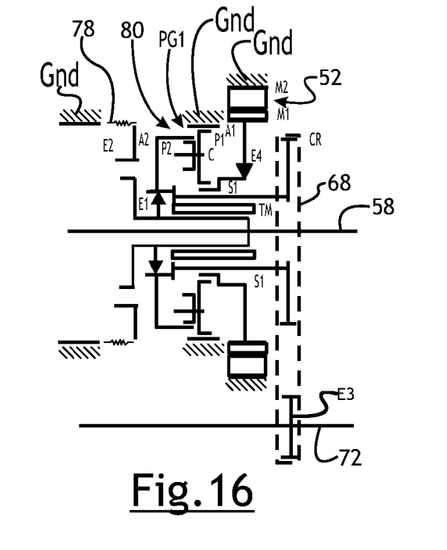
FIG. 16 illustrates a schematic of an electric cycle powertrain according to a number of variations.

Referring to FIG. 16, in a number of variations, an electric cycle 30 may optionally include a fourth mechanical mechanism E4 which may be operatively attached to the rotor M1 and may be constructed and arranged to connect or disconnect the sun gear S1 from the rotor M1. When the fourth mechanical mechanism E4 is closed, the rotor M1 may be operatively connected to the sun gear S1 and may rotate the sun gear S1 which may drive the stepped pinion planetary gear set PG1 to drive the chain ring CR. When the fourth mechanical mechanism E4 is open, the rotor M1 and the sun gear S1 may be disconnected.

In a number of variations, a spring 78 may be operatively connected to the crankshaft 58 and the frame 32 which may absorb static abuse and may provide a rider proportional feel of the rotation of the pedal assemblies 60, 64 when the second mechanical mechanism E2 is locked in either direction.

Figure 18:
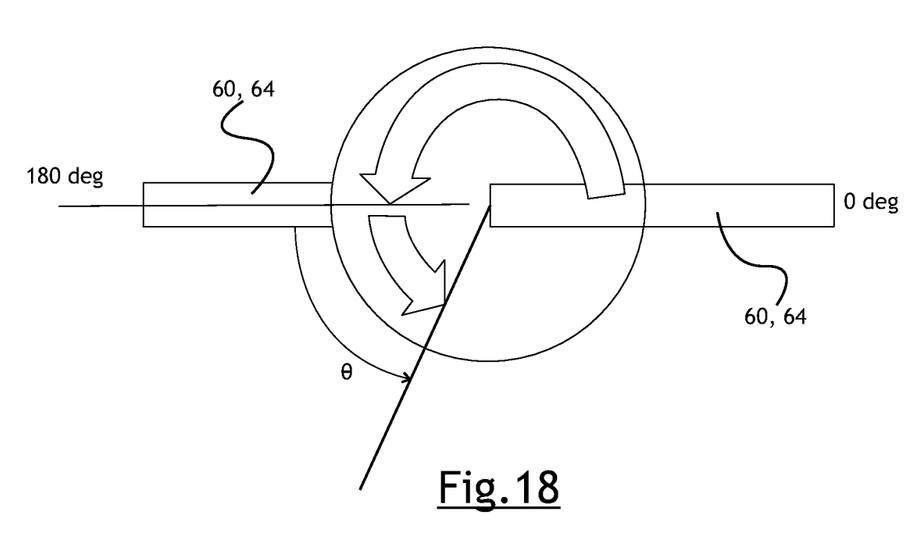
FIG. 18 illustrates a schematic of a regenerative braking command according to a number of variations.

The electric cycle 30 illustrated above may be selectively constructed and arranged to provide for at least one of the following modes: (A) Pedal assist, wherein the torque (and optionally the speed, position, and direction of the crankshaft 58) is detected and assistance in rotating the chain ring CR is provided by the electric motor 52 in response to the detected torque, (and optionally the speed and direction of the crankshaft 58); (B) Coast with spinning motor 52 synchronized with the road, wherein the crankshaft 58 is de-coupled from the electric motor 52 and the rider is not rotating the pedal assemblies 60, 64 of the electric cycle 30 but the wheels 42, 74 and motor 52 are spinning; (C) Coast without spinning motor 52 synchronized with the road, wherein the crankshaft 58 is not coupled to the motor 52 and the motor 52 is not coupled to the chain ring CR; (D1) Electronic coaster with regenerative braking mode, wherein the first and second pedals assemblies 60, 64 are locked from rotating and the crankshaft 58 is de-coupled from the electric motor 52, and the rider may apply a counterclockwise/backward force to the backward pedal 62, 66 so that the torque measuring device TM measures the reaction torque and causes a regenerative braking command to be sent to the motor 52 to generate energy which is fed back into the battery pack 54 increasing the efficiency and range of the motor 52; (D2) Regenerative braking mode, wherein the motor 52 slows down the electric cycle 30 while a regenerative braking command is sent to the motor 52. Referring to FIG. 18, in one variation, the regenerative braking command may be sent to the motor 52 through a counterclockwise/backward motion applied to a reward facing pedal 62,

66. In this variation, the reward facing pedal 62, 66 may be enabled to rotate within a predetermined angle θ which may be greater than 180 degrees. When the backward facing pedal assembly 60, 64 is at 180 degrees, there may be no regenerative braking command sent to the motor 52. When the backward facing pedal 62, 66 is rotated counterclockwise to an angle within a range between 180 degrees and the predetermined angle θ, a proportional regenerative braking command may be sent to the motor 52. When the backward facing pedal 62, 66 is rotated fully to the predetermined angle θ, a maximum regenerative braking command may be sent to the motor 52. In another variation, the regenerative braking command may be sent to the motor 52 through activation of a switch or control on the electric cycle 30 to generate energy which may be fed back into the battery pack 54 which may increase the efficiency of the battery pack 54 and may increase the range of the battery pack 54; (E) Pedal force throttle mode, wherein the clockwise torque/force of the crankshaft 58 is measured when the second mechanical mechanism E2 is locked and wherein the force applied on a forward pedal 62, 66 by the rider is detected and used as a throttle input to the motor 52; or (F) Pedal mode without back drive lockup, wherein the rider can rotate the crankshaft 58 in a clockwise direction to move the electric cycle 30 forward, and the rider can rotate the crankshaft 58 in a counter clockwise direction in a free spinning mode without back drive lockup or locking the rear wheel 74 when moving backwards.

Chart 1 below illustrates five different states (States 1-5) for an electric cycle 30 to function or operate in one or more modes of operations A-F, and identifies the operating conditions for E1-E4 according to a number of variations.

CHART 1

| State | Operation Mode(s) | Power | from crank E1 FWD | E1 REV | E2 FWD | E2 REV | rear wheel E3 FWD | E3 REV | E4 FWD | E4 REV |
|---|---|---|---|---|---|---|---|---|---|---|
| 1 | A, B, D1, D2, F | On | OWC; locked | open | open | open | locked | locked | N/A | N/A |
| 2 | A, C, F | On | OWC; locked | open | open | open | locked | open | N/A | N/A |
| 3 | A, B, D1, D2 | On | OWC; locked | open | open | locked | locked | locked | N/A | N/A |
| 4 | B, D1, D2, E | On | OWC; locked | open | locked | locked | locked | locked | N/A | N/A |
| 5 | A, C, F | On | OWC; locked | open | N/A | N/A | N/A | N/A | OWC, locked | open |

Figure 8:
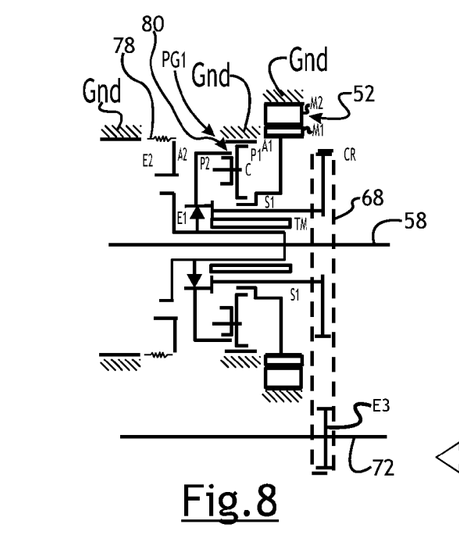
FIG. 8 illustrates a schematic of an electric cycle powertrain according to a number of variations.
Figure 9:
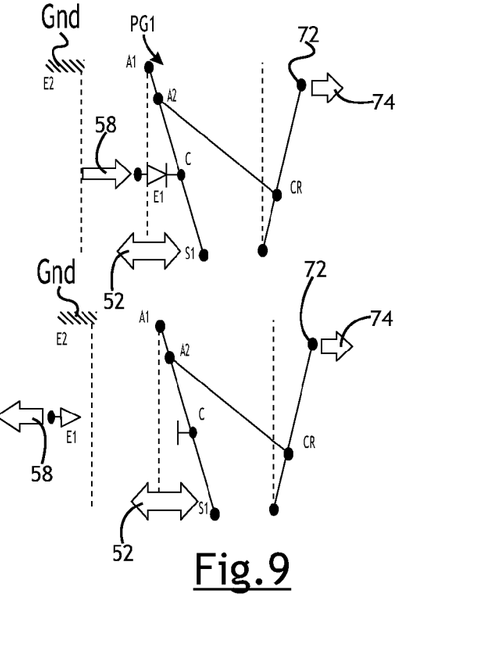
FIG. 9 illustrates lever diagrams of the electric cycle powertrain illustrated in FIG. 8 representing a forward and a reverse direction according to a number of variations.

FIGS. 8 and 9 illustrate a schematic and lever diagrams for an electric cycle powertrain 76 constructed and arranged to achieve State 1 as identified in Chart 1. State 1 may allow the electric cycle 30 to function or operate in the following modes: (A) Pedal assist; (B) Coast with spinning motor synchronized with road; (D1) Electronic coaster with regenerative braking mode; (D2) Regeneration, or (F) Pedal mode without back drive lockup. In State 1, the power to the motor 52 is ON. The first mechanical mechanism E1 may be a one-way clutch E1 which may be closed so that the torque to the rear hub 72 is supplied by the crankshaft 58 and the motor 52. In State 1, the second mechanical mechanism E2 may be open so that the first and second pedal assemblies 60, 64 may rotate in both a clockwise/forward direction and a counter clockwise/backward direction. In State 1, the rider may coast, may rotate the first and/or second pedal assemblies 60, 64 in a clockwise/forward direction to provide torque to the chain ring CR (which may be measured by a torque measurement device TM to control operation of the motor 52 during the coaster mode or the regenerative braking mode), or may rotate the first and/or second pedal assemblies 60, 64 in a counterclockwise/backward direction without back drive lockup and may provide additional regenerative braking by a back-pedal force (counterclockwise).

Figure 10:
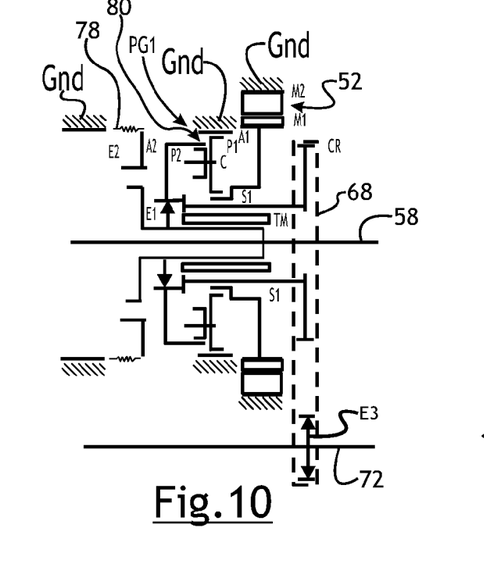
FIG. 10 illustrates a schematic of an electric cycle powertrain according to a number of variations.
Figure 11:
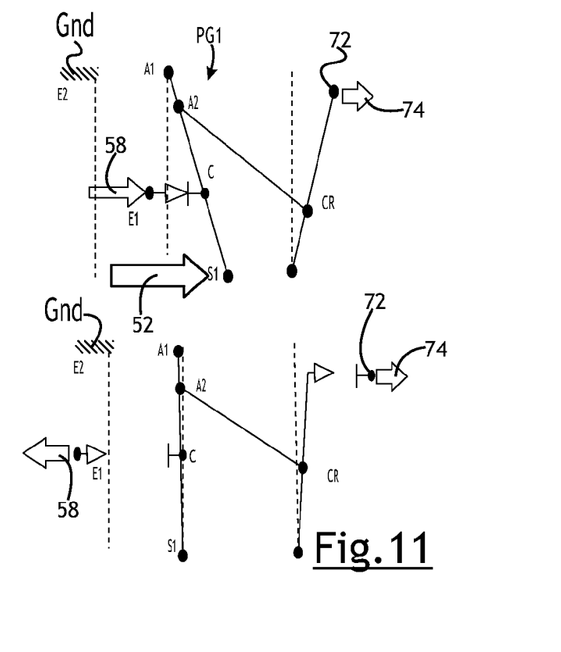
FIG. 11 illustrates lever diagrams of the electric cycle powertrain illustrated in FIG. 10 representing a forward and a reverse direction according to a number of variations.

FIGS. 10 and 11 illustrate a schematic and lever diagrams for an electric cycle powertrain 76 constructed and arranged to achieve State 2, identified in Chart 1. State 2 may allow the electric cycle 30 to function or operate in the following modes: (A) Pedal assist; (C) Coast with spinning motor asynchronous with road; or (F) Pedal mode without back drive lockup. In State 2, the power to the motor 52 is ON. The first mechanical mechanism E1 may be a one-way clutch E1 which may be closed so that the torque to the rear hub 72 is supplied by the crankshaft 58 or the motor 52. In State 2, the second mechanical mechanism E2 may be open so that the first and second pedal assemblies 60, 64 may rotate in both a clockwise/forward direction and a counter clockwise/backward direction. In State 2, the rider may coast, may rotate the first and/or second pedal assemblies 60, 64 in a clockwise/forward direction to provide additional torque to the rear hub 72 axle and may be assisted by the motor 52, or may rotate the first and/or second pedal assemblies 60, 64 in a counterclockwise/backward direction. The third mechanical mechanism E3 may be a one-way clutch which may be open to disconnect the rear hub 72 from receiving torque from the chain ring CR when the rider is pedaling at least one of the first or second pedal assemblies 60, 64 in a counterclockwise/backward direction so that the rear hub 72 may freely coast without back drive lockup.

Figure 12:
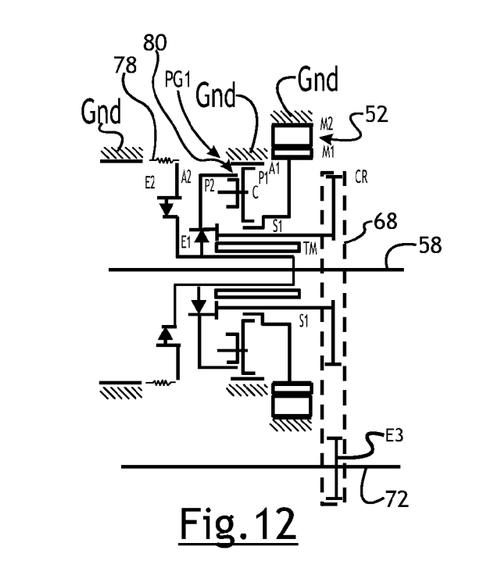
FIG. 12 illustrates a schematic of an electric cycle powertrain according to a number of variations.
Figure 13:
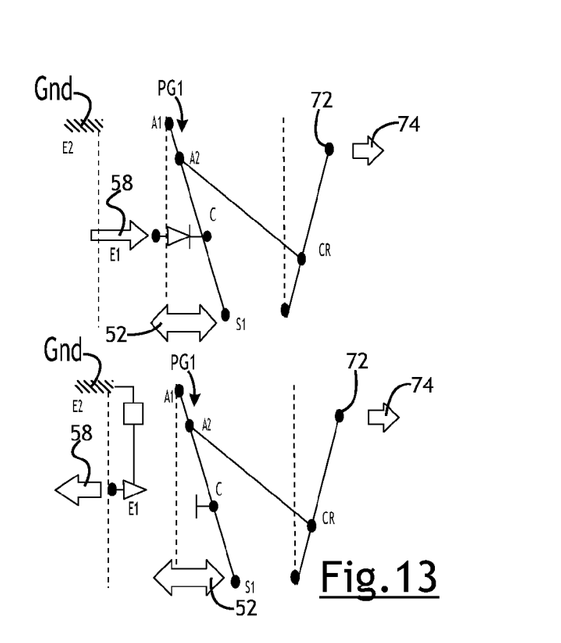
FIG. 13 illustrates lever diagrams of the electric cycle powertrain illustrated in FIG. 12 representing a forward and a reverse direction according to a number of variations.

FIGS. 12 and 13 illustrate a schematic and lever diagrams for an electric cycle powertrain 76 constructed and arranged to achieve State 3, identified in Chart 1 above. State 3 may allow the electric cycle 30 to function or operate in the following modes: (A) Pedal assist; (B) Coast with spinning motor synchronized with the road; (D1) Electronic coaster with regenerative braking mode; or (D2) Regeneration. In State 3, the power to the motor 52 is ON. The first mechanical mechanism E1 may be a one-way clutch E1 which may be closed so that the torque to the rear hub 72 is supplied by the motor 52. In State 3, the second mechanical mechanism E2 may be arranged so that the first and second pedal assemblies 60, 64 may rotate in a clockwise/forward direction but are prevented from fully rotating in the counterclockwise/backward direction. In State 3, the rider may coast, may rotate the first and/or second pedal assemblies 60, 64 in a clockwise/forward direction to provide additional gear ratio to the motor 52, or may apply a backward force to the first or second pedal assemblies 60, 64 to command regenerative braking.

Figure 14:
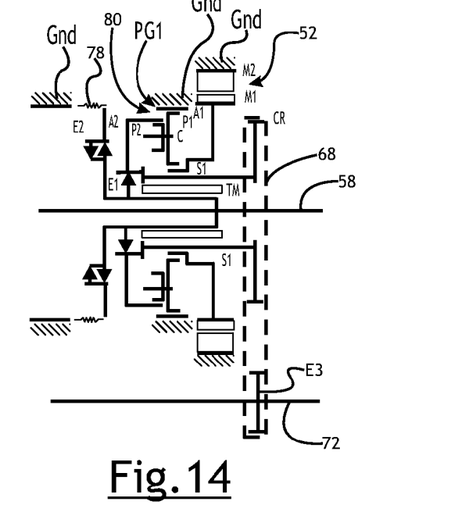
FIG. 14 illustrates a schematic of an electric cycle powertrain according to a number of variations.
Figure 15:
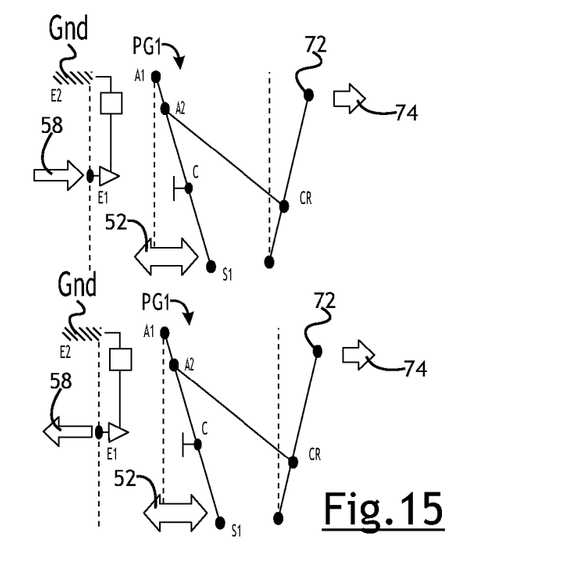
FIG. 15 illustrates lever diagrams of the electric cycle powertrain illustrated in FIG. 14 representing a forward and a reverse direction according to a number of variations.

FIGS. 14 and 15 illustrate a schematic and lever diagrams for an electric cycle powertrain 76 constructed and arranged to achieve State 4, identified in Chart 1. State 4 may allow the electric cycle 30 to function or operate in the following modes: (B) Coast with spinning motor synchronized with the road; (D1) Electronic coaster with regenerative braking mode; (D2) Regeneration; and (E) Pedal force throttle. In State 4, the power to the motor 52 is ON. The first mechanical mechanism E1 may be a one-way clutch E1 which may be closed so that the torque to the rear hub 72 is supplied by the crankshaft 58 and assisted by the motor 52. In State 4, the second mechanical mechanism E2 may be arranged so that the first and second pedal assemblies 60, 64 may be prevented from fully rotating in the clockwise/forward direction and the counterclockwise/backward direction. In State 4, the rider may coast, may apply a forward force to the first or second pedal assembly 60, 64 to control the speed of the electric cycle 30, or may apply a counterclockwise/backward force to the first or second pedal assembly 60, 64 to command regenerative braking.

Figure 17:
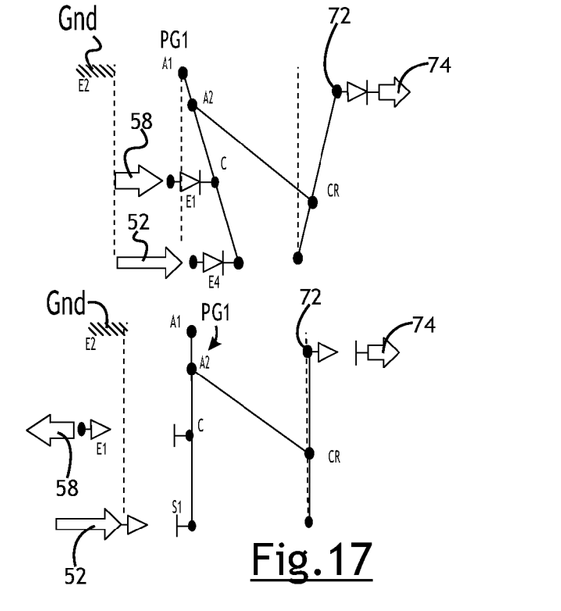
FIG. 17 illustrates lever diagrams of the electric cycle powertrain illustrated in FIG. 16 representing a forward and reverse direction according to a number of variations.

FIGS. 16 and 17 illustrate a schematic and lever diagrams for an electric cycle powertrain 76 constructed and arranged to achieve State 5, identified above in Chart 1. State 5 may allow the electric cycle 30 to function or operate in the following modes: (A) Pedal assist; (C) Coast without spinning motor 52 synchronized with the road; or (F) Pedal mode without back drive lockup. In State 5, the power to the motor 52 is ON. The first mechanical mechanism E1 may be a one-way clutch E1 which may be closed so that the torque to the rear hub 72 is supplied by the crankshaft 58 and the motor 52. In State 5, the fourth mechanical mechanism E4 may be closed so that the rotor M1 may be operatively connected to the sun gear S1 so that the rotor M1 rotates the sun gear S1 to drive the stepped pinion planetary gear set PG1 to drive the chain ring CR. The pedal assemblies 60, 64 may be free to rotate in clockwise and counterclockwise directions. In State 5, the rider may coast, may rotate the first and/or second pedal assemblies 60, 64 in a clockwise/forward direction to provide torque to the chain ring CR, or may rotate the first and/or second pedal assemblies 60, 64 in a counterclockwise/backward direction without back drive lockup The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include an electric cycle powertrain comprising: a motor comprising a rotor and a stator; a crankshaft operatively connected to a first pedal assembly and a second pedal assembly; a stepped pinion planetary gear set comprising a sun gear, at least one stepped pinion gear having a first pinion and a second pinion operatively attached to each other, wherein the first pinion is operatively connected to the sun gear and rotates within a grounded first ring gear and the second pinion rotates within a second ring gear; wherein the sun gear is further operatively connected to the rotor; wherein the second ring gear is operatively connected to the crankshaft and the first pedal assembly and the second pedal assembly; wherein the first pinion and the second pinion are operatively connected to a carrier; wherein the second ring gear is operatively connected to the chain ring operatively connected to a chain which drives a rear sprocket of a rear wheel; and a torque measuring device operatively connected to the crankshaft.

Variation 2 may include an electric cycle powertrain as set forth in Variation 1 wherein the first pinion of the at least one stepped pinion gear has a first diameter greater than a second diameter of the second pinion of the at least one stepped pinion gear.

Variation 3 may include an electric cycle powertrain as set forth in any of Variations 1-2 wherein the second ring gear is constructed and arranged to receive torque input from the first pedal assembly and the second pedal assembly.

Variation 4 may include an electric cycle powertrain as set forth in any of Variations 1-3 wherein the sun gear is constructed and arranged to receive input from the motor.

Variation 5 may include an electric cycle powertrain as set forth in any of Variations 1-4 further comprising at least one of a first mechanical mechanism operatively attached to the first pedal assembly and the second pedal assembly, a second mechanical mechanism operatively attached to the crankshaft, a third mechanical mechanism operatively attached to the rear sprocket; or a fourth mechanical mechanism operatively connected to the rotor.

Variation 6 may include an electric cycle powertrain as set forth in any of Variations 1-5 wherein at least one of the first mechanical mechanism, the second mechanical mechanism, the third mechanical mechanism, or the fourth mechanical mechanism are a selective one-way clutch.

Variation 7 may include an electric cycle powertrain as set forth in Variation 5 wherein the first mechanical mechanism is constructed and arranged so that when the first mechanical mechanism is open, the crankshaft is rotated by rotation of at least one of the first pedal assembly or the second pedal assembly, and when the first mechanical mechanism is closed, the motor is rotated by the crankshaft.

Variation 8 may include an electric cycle powertrain as set forth in any of Variations 5-7 wherein the first mechanical mechanism is constructed and arranged to allow for input to the chain ring from at least one of the motor or the crankshaft without back driving the crankshaft.

Variation 9 may include an electric cycle powertrain as set forth in any of Variations 5-8 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

Variation 10 may include an electric cycle powertrain as set forth in any of Variations 5-9 wherein the third mechanical mechanism is constructed and arranged so that when the third mechanical mechanism is closed, a rear hub is operatively connected to the rear sprocket to receive torque from the rear sprocket and when the third mechanical mechanism is open, the rear hub is disconnected from the rear sprocket allowing the rear hub to coast freely.

Variation 11 may include an electric cycle powertrain as set forth in any of Variations 5-10 wherein the fourth mechanical mechanism is constructed and arranged to connect or disconnect the sun gear from the rotor.

Variation 12 may include an electric cycle powertrain as set forth in any of Variations 1-11 wherein the stepped pinion planetary gear set is arranged within the motor.

Variation 13 may include an electric cycle powertrain as set forth in any of Variations 1-12 wherein the torque measuring device measures a reaction torque of the crankshaft and is used to calculate a rider input torque.

Variation 14 may include an electric cycle powertrain as set forth in Variation 13 wherein the torque measuring device sends a signal of the rider input torque to an electronic control device to control operation of the motor during a coaster mode or a regenerative braking mode.

Variation 15 may include an electric cycle powertrain as set forth in any of Variations 1-14 further comprising a spring operatively connected to the second mechanical mechanism which is constructed and arranged to absorb static abuse and to provide a rider with proportional feel when a second mechanical mechanism locks the first pedal assembly and the second pedal assembly from rotation.

Variation 16 may include an electric cycle powertrain as set forth in any of Variations 1-15 wherein the electric cycle powertrain is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, or a pedal mode without back drive lockup mode.

Variation 17 may include an electric cycle powertrain as set forth in Variation 16 wherein in the regeneration mode, the motor slows down the electric cycle while a regenerative braking command is sent to the motor.

Variation 18 may include an electric cycle powertrain as set forth in Variation 17 wherein the regenerative braking command is sent to the motor though a counterclockwise motion applied to a reward facing pedal assembly, wherein the rearward facing pedal assembly is enabled to rotate within a predetermined angle greater than 180 degrees so that when the backward facing pedal assembly is at 180 degrees a regenerative braking command is not sent to the motor and when the backward facing pedal assembly is rotated with a range between 180 degrees and the predetermined angle, than a proportional regenerative braking command is sent to the motor.

Variation 19 may include an electric cycle powertrain as set forth in Variation 17 wherein the regenerative braking command is sent to the motor through activation of a switch or control on the electric cycle.

Variation 20 may include an electric cycle comprising: a crankshaft; a first pedal assembly and a second pedal assembly operatively connected to the crankshaft; a chain ring operatively connected to the crankshaft; a chain operatively connected to the chain ring; a rear sprocket operatively connected to the chain and a rear hub; a rear wheel connected to the rear hub; a motor comprising a stator and a rotor operatively connected to the crankshaft; a battery pack operatively connected to the motor; a stepped pinion planetary gear set comprising a sun gear, at least one stepped pinion gear having a first pinion and a second pinion operatively connected to each other and operatively connected to the sun gear, wherein the first pinion rotates within a grounded first ring gear and the second pinion rotates within a second ring gear; wherein the sun gear is operatively connected to the rotor and the crankshaft; wherein the second ring gear is operatively connected to the crankshaft and the first pedal assembly and the second pedal assembly; wherein the at least one stepped pinion gear is operatively connected to a carrier; and wherein the carrier is operatively connected to the chain ring to drive the rear sprocket; and a torque measuring device operatively connected to the crankshaft constructed and arranged to measure a reaction torque of the crankshaft and to calculate a rider input torque based on the reaction torque of the crankshaft to control operation of the motor during a coaster mode or a regenerative braking mode.

Variation 21 may include an electric cycle as set forth in Variation 20 further comprising at least one of a first mechanical mechanism operatively attached to the first and the second pedal assembly constructed and arranged so that when the first mechanical mechanism is closed, torque to the rear sprocket is provided by at least one of the motor or the first pedal assembly and the second pedal assembly, and when the first mechanical mechanism is open, torque to the rear sprocket is provided by the motor; a second mechanical mechanism operatively connected to the torque sensor, wherein the second mechanical mechanism is constructed and arranged to selectively provide for at least one of: free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only; a third mechanical mechanism operatively attached to the rear hub constructed and arranged so that when the third mechanical mechanism is closed, the rear hub may be operatively connected to the rear sprocket and when the third mechanical mechanism is open, the rear hub is disconnected from the rear sprocket; or a fourth mechanical mechanism constructed and arranged to connect or disconnect the sun gear from the rotor.

Variation 22 may include an electric cycle as set forth in any of Variations 20-21 wherein the electric cycle is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, or a pedal mode without back drive lockup mode.

The above description of select variations within the scope of the invention is merely illustrative in nature and, thus, variations or variants thereof are not to be regarded as a departure from the spirit and scope of the invention.

What is claimed is:

1. An electric cycle powertrain comprising:
   a motor comprising a rotor and a stator;
   a crankshaft operatively connected to a first pedal assembly and a second pedal assembly;
   a stepped pinion planetary gear set comprising a sun gear, at least one stepped pinion gear having a first pinion and a second pinion operatively attached to each other, wherein the first pinion is operatively connected to the sun gear and rotates within a grounded first ring gear and the second pinion rotates within a second ring gear;
   wherein the sun gear is further operatively connected to the rotor;
   wherein the second ring gear is operatively connected to the crankshaft and the first pedal assembly and the second pedal assembly;

wherein the first pinion and the second pinion are operatively connected to a carrier;

wherein the second ring gear is operatively connected to a chain ring operatively connected to a chain which drives a rear sprocket of a rear wheel; and a torque measuring device operatively connected to the crankshaft.

2. The electric cycle powertrain of claim 1 wherein the first pinion of the at least one stepped pinion gear has a first diameter greater than a second diameter of the second pinion of the at least one stepped pinion gear.

3. The electric cycle powertrain of claim 1 wherein the second ring gear is constructed and arranged to receive torque input from the first pedal assembly and the second pedal assembly.

4. The electric cycle powertrain of claim 1 wherein the sun gear is constructed and arranged to receive input from the motor.

5. The electric cycle powertrain of claim 1 further comprising at least one of a first mechanical mechanism operatively attached to the first pedal assembly and the second pedal assembly, a second mechanical mechanism operatively attached to the crankshaft, a third mechanical mechanism operatively attached to the rear sprocket; or a fourth mechanical mechanism operatively connected to the rotor.

6. The electric cycle powertrain of claim 5 wherein at least one of the first mechanical mechanism, the second mechanical mechanism, the third mechanical mechanism, or the fourth mechanical mechanism are a selective one-way clutch.

7. The electric cycle powertrain of claim 5 wherein the first mechanical mechanism is constructed and arranged so that when the first mechanical mechanism is open, the crankshaft is rotated by rotation of at least one of the first pedal assembly or the second pedal assembly, and when the first mechanical mechanism is closed, the motor is rotated by the crankshaft.

8. The electric cycle powertrain of claim 7 wherein the first mechanical mechanism is constructed and arranged to allow for input to the chain ring from at least one of the motor or the crankshaft without back driving the crankshaft.

9. The electric cycle powertrain of claim 5 wherein the second mechanical mechanism is constructed and arranged to allow for at least one of free rotation of the first pedal assembly and the second pedal assembly in both a clockwise and a counterclockwise direction; preventing of rotation of the first pedal assembly and the second pedal assembly in both the clockwise and the counterclockwise direction; preventing of rotation of the first pedal assembly and the second pedal assembly in the clockwise direction and allowing of rotation in the counterclockwise direction; or preventing of rotation of the first pedal assembly and the second pedal assembly in the counterclockwise direction and allowing of rotation in the clockwise direction.

10. The electric cycle powertrain of claim 5 wherein the third mechanical mechanism is constructed and arranged so that when the third mechanical mechanism is closed, a rear hub is operatively connected to the rear sprocket to receive torque from the rear sprocket and when the third mechanical mechanism is open, the rear hub is disconnected from the rear sprocket allowing the rear hub to coast freely.

11. The electric cycle powertrain of claim 5 wherein the fourth mechanical mechanism is constructed and arranged to connect or disconnect the sun gear from the rotor.

12. The electric cycle powertrain of claim 1 wherein the stepped pinion planetary gear set is arranged within the motor.

13. The electric cycle powertrain of claim 1 wherein the torque measuring device measures a reaction torque of the crankshaft and is used to calculate a rider input torque.

14. The electric cycle powertrain of claim 13 wherein the torque measuring device sends a signal of the rider input torque to an electronic control device to control operation of the motor during a coaster mode or a regenerative braking mode.

15. The electric cycle powertrain of claim 1 further comprising a spring operatively connected to the second mechanical mechanism which is constructed and arranged to absorb static abuse and to provide a rider with proportional feel when a second mechanical mechanism locks the first pedal assembly and the second pedal assembly from rotation.

16. The electric cycle powertrain of claim 1 wherein the electric cycle powertrain is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, or a pedal mode without back drive lockup mode.

17. The electric cycle powertrain of claim 16 wherein in the regeneration mode, the motor slows down the electric cycle while a regenerative braking command is sent to the motor.

18. The electric cycle powertrain of claim 17 wherein the regenerative braking command is sent to the motor though a counterclockwise motion applied to a reward facing pedal assembly, wherein the rearward facing pedal assembly is enabled to rotate within a predetermined angle greater than 180 degrees so that when the backward facing pedal assembly is at 180 degrees a regenerative braking command is not sent to the motor and when the backward facing pedal assembly is rotated with a range between 180 degrees and the predetermined angle, than a proportional regenerative braking command is sent to the motor.

19. The electric cycle powertrain of claim 17 wherein the regenerative braking command is sent to the motor through activation of a switch or control on the electric cycle.

20. An electric cycle comprising:
a crankshaft;
a first pedal assembly and a second pedal assembly operatively connected to the crankshaft;
a chain ring operatively connected to the crankshaft;
a chain operatively connected to the chain ring;
a rear sprocket operatively connected to the chain and a rear hub;
a rear wheel connected to the rear hub;
a motor comprising a stator and a rotor operatively connected to the crankshaft;
a battery pack operatively connected to the motor;
a stepped pinion planetary gear set comprising a sun gear, at least one stepped pinion gear having a first pinion and a second pinion operatively connected to each other and operatively connected to the sun gear, wherein the first pinion rotates within a grounded first ring gear and the second pinion rotates within a second ring gear;
wherein the sun gear is operatively connected to the rotor and the crankshaft;
wherein the second ring gear is operatively connected to the crankshaft and the first pedal assembly and the second pedal assembly;
wherein the at least one stepped pinion gear is operatively connected to a carrier; and wherein the carrier is operatively connected to the chain ring to drive the rear sprocket; and a torque measuring device operatively connected to the crankshaft constructed and arranged to measure a reaction torque of the crankshaft and to calculate a rider input torque based on the reaction torque of the crankshaft to control operation of the motor during a coaster mode or a regenerative braking mode.

21. The electric cycle of claim 20 further comprising at least one of a first mechanical mechanism operatively attached to the first and the second pedal assembly constructed and arranged so that when the first mechanical mechanism is closed, torque to the rear sprocket is provided by at least one of the motor or the first pedal assembly and the second pedal assembly, and when the first mechanical mechanism is open, torque to the rear sprocket is provided by the motor; a second mechanical mechanism operatively connected to the torque sensor, wherein the second mechanical mechanism is constructed and arranged to selectively provide for at least one of: free rotation of the first pedal assembly and the second pedal assembly in both the clockwise and counterclockwise directions; locking the first pedal assembly and the second pedal assembly in both the clockwise and counterclockwise directions; locking the first pedal assembly and the second pedal assembly in the clockwise direction only; or locking the first pedal assembly and the second pedal assembly in the counterclockwise direction only; a third mechanical mechanism operatively attached to the rear hub constructed and arranged so that when the third mechanical mechanism is closed, the rear hub may be operatively connected to the rear sprocket and when the third mechanical mechanism is open, the rear hub is disconnected from the rear sprocket; or a fourth mechanical mechanism constructed and arranged to connect or disconnect the sun gear from the rotor.

22. The electric cycle of claim 20 wherein the electric cycle is constructed and arranged to selectively operate in at least one of a pedal assist mode, a coast with spinning motor synchronized with the road mode, a coast without spinning motor synchronized with the road mode, an electronic coaster/regeneration mode, a regeneration mode, a pedal throttle mode, or a pedal mode without back drive lockup mode.

* * * * *